United States Patent [19]

Mashburn et al.

[11] Patent Number: 5,330,154
[45] Date of Patent: Jul. 19, 1994

[54] PORTED BAYONET COUPLING

[76] Inventors: James S. Mashburn, 213 Rivo Alto Canal; Jerry P. Mashburn, Rivo Alto Canal, both of Long Beach, Calif. 90803

[21] Appl. No.: 984,910
[22] Filed: Dec. 2, 1992
[51] Int. Cl.⁵ ............................................. F16L 37/28
[52] U.S. Cl. ................................. 251/144; 251/149.1; 251/149.5
[58] Field of Search .................. 251/144, 149.1, 149.5

[56] References Cited

U.S. PATENT DOCUMENTS

| | | | |
|---|---|---|---|
| 611,276 | 9/1888 | Reinold | 251/149.5 |
| 766,659 | 8/1904 | Beebe | 251/149.5 |
| 968,711 | 8/1910 | Stevenson | 251/149.5 |
| 1,022,851 | 4/1912 | Knack | 251/149.5 |
| 1,754,723 | 4/1930 | McGahey | 251/149.5 |

Primary Examiner—A. Michael Chambers
Attorney, Agent, or Firm—Fulwilder, Patton, Lee & Utecht

[57] ABSTRACT

An apparatus for the mechanical and orificial coupling of a conventional liquid gas fuel supply container and/or supply outlet fixture to a control valve and/or similar secondary fuel outlet port. The coupling apparatus comprises a shaft modifying the inlet of a conventional control valve, which provides an extended port for orificial connection, and a plastic collar which intercalates into a conventional recessed supply outlet orifice fixture. The collar is first engaged with the supply outlet fixture which then makes a socket for the intercalation of the control valve shaft in a quick and secure bayonet fashion. No screw threads are used in any part of the engagement mechanisms.

9 Claims, 2 Drawing Sheets

PORTED BAYONET COUPLING

BACKGROUND OF THE INVENTION

1. Field of the Invention

The present invention relates to couplings for structurally connecting and orificially connecting gas and/or liquid gas supply containers to control valves and/or other outlet ports, and more particularly to couplings used with portable and/or disposable liquid gas cannisters.

2. Brief Description of the Prior Art

The predominant world wide method for mechanically connecting a fuel supply control valve to a portable supply container is to use mating screw threads. Screw threads are also the predominant means of connection for larger fuel containers such as a welding tanks or large propane tanks, and these larger containers also have control valves governing outlet orifices to which a regulator can be attached when the valve is shut off. However, smaller and especially disposable fuel containers have very simple orifice valves which allow the escape of fuel as soon as insertion of a male needle valve orifice typical of the conventional control valves available occurs.

These conventional control valves made for the portable and disposable type fuel cannisters normally have a throat surrounding their inlet needle orifices, with internal screw threads that receive the external screw threads of a raised neck surrounding the outlet orifice of the cannister. When the control valve is screwed onto the cannister the seals about the needle valve orifice and the cannister orifice come into contact as the orifices connect with continued screwing of the threads. This is exemplified by commonly used portable propane torches, portable gas stoves and the like.

In addition to some of the more common disadvantages of using screw threads for repeated engagement or disengagement of parts such as the speed and ease of the connection, or the wearing, stripping, corroding, or other compromising of the screw threads mechanical integrity, there are problems specific to the type of connection presently discussed.

When a conventional fuel control valve is screwed onto a conventional fuel cannister there is a period when the connection of orifices is occurring but not sealed. By varying the pitch of the threads this period can be minimized, but not eliminated. Therefore leakage of fuel during both the engagement and disengagement of the control valve, as well as possible sustained leakage caused by incomplete screwing, or inadvertent unscrewing of the control valve constitutes a serious and possibly dangerous disadvantage to using screw threads for this type of connection.

An alternative coupling solution is used by Camping Gaz International TM, and disclosed in French patent no 8 701 097, and European patent no. 0 278 873, the named inventor is Daniel Finand. Finands cannister does not use screw threads. As exemplified by the Camping Gaz International TM CV 470 cartridge, DOT - E 9758, CTC SP 2739, the cannister orifice is in a raised nipple which is centered in a cylindrical throat recessed into the cannister. This throat is characterized by an involuted lip around its rim, and a depression or groove formed beneath the rim around the interior perimeter of the throat.

Finands corresponding control valve has a probiscus-like extension of the control valve inlet, housing the needle valve orifice near its end. This inlet stalk has external screw threads which mate with internal screw threads in a large plastic coupling member. This plastic member is a cylinder which by turning on the screw threads moves up or down the inlet stalk. It is characterized by a large radially extended wheel, which has vertical ridges around its perimeter for manual gripping, and turns the entire plastic member about the inlet stalk. The bottom of the plastic cylinder within the wheel is cut into four sections below the screw threads that form four elastic prongs which are juxtaposed to the lower portion of the inlet stalk. The lowermost end of the inlet stalk has a flared back rim just above the lowermost ends of the four plastic prongs, which also have corresponding angled lips facing the inlet rim. Each prong has on its outer side, opposite the angled lips, a projected angular ridge.

The coupling works by setting the control valve onto the cannister so that the plastic prongs are beneath the inlet rim and easily inserted beneath the inside lip of the throat. Whereupon as the plastic wheel is turned the plastic member moves up the inlet stalk pulling the angled ends of the prongs against the flared rim of the inlet stalk. This forces the elastic prongs outwardly and the projected angular edges of the prongs key into the annular groove beneath the involuted lip of the cannister throat. With the prongs caught in the throat of the cannister, continued turning of the wheel forces the inlet stalk down over the cannister outlet nipple. The needle valve inside the inlet stalk is thusly inserted into the cannister outlet orifice.

The problem with Finands coupling solution is that screw threads still drive the engaging and disengaging mechanisms. Accordingly, leakage is no less a problem if not worse than the conventional solutions, in that the plastic screw threaded portion has even more of a propensity to partially unscrew during normal use and movement of the parts. Therefore the need is evident for a coupling mechanism where engagement and/or disengagement is not driven by the turning of screw threads.

OBJECTS AND ADVANTAGES OF THE INVENTION

The present invention anticipates the obsolescence of screw threads used in quick couplings, and makes use of them in the invention embodiment presently disclosed only to permanently convert conventional screw thread type control valves to the novel arrangement. This novel coupling device, hereinafter referred to as the coupling device, makes use of the European style cannister with an outlet orifice nipple in a recessed and grooved throat.

The coupling device comprises a hollow shaft which permanently modifies the inlet of a conventional screw thread control valve, or can be included during manufacture of the control valve. The hollow shaft houses the needle valve orifice and secondary seals within its opening, and is otherwise smooth on its outside with the exception of a pin or key at its lowermost margin. The coupling device additionally comprises a split plastic collar which on its outside fits into the cannister throat and catches in its inside groove while the split permits deformation of the collar so that it is removable or replaceable into the cannister. The inside of the collar provides a socket for the shaft. The collar therefore is snapped into the cannister outlet fixture before articulation of the control valve shaft.

The coupling is made by inserting the control valve so that the shaft pin slides down through the split in the collar, and when the control valve and shaft are nested in the collar with one push, the collar is manually held to prevent rotation, while the control valve shaft is given a twist so that the shaft pin binds underneath the bottom rim of the collar. With the rigid control valve shaft articulated into the socket of the plastic collar, the collar is no longer capable of undergoing transverse elastic deformation and is accordingly locked into the cannister outlet fixture.

The control valve, shaft, and collar can rotate freely within the cannister outlet fixture during locked engagement, and thusly fuel flow through the coupling is unaffected by any movement of the parts. Positive stops on the collar rim retain the pin on either side of the collar slit, so that it requires advertent manual force to actuate engagement or disengagement. When adequate rotational force is used to move the pin from a fully bound position to the mouth of the slit, the control valve instantaneously pops off. This quick bayonet style coupling is either on or off, with no in between sort of attachment.

Therefore, objects of the coupling are an easy, quick, economical, sturdy, positive attachment of control valve to cannister, providing either full engagement with concurrent full connection of inlet and outlet orifices, or complete disengagement. The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements of modes of operation that are properly within the scope of the appended claims.

BRIEF DESCRIPTION OF THE DRAWINGS

Novel features and advantages of the present invention, in addition to those mentioned above, will become apparent to those skilled in the art from reading the following detailed description in conjunction with the accompanying drawings wherein.

DESCRIPTION OF THE PREFERRED EMBODIMENT

FIGS. 1–6

Figure 1:
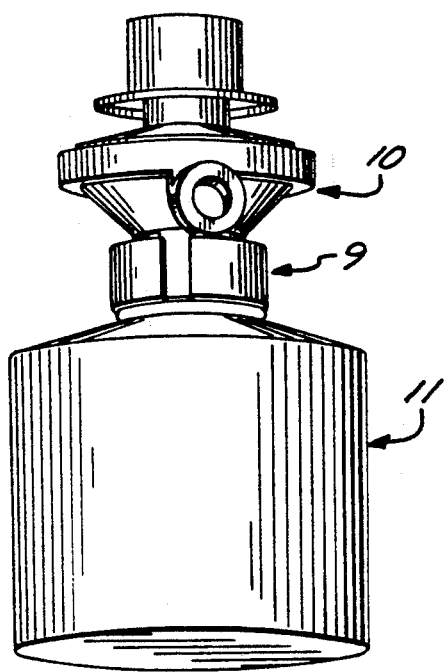
FIG. 1 is a pictorial view of a control valve coupled to a fuel cannister.

Referring to FIG. 1, the complete novel coupling comprises two major engagements; one of a collar shown in the general direction of arrow 9 to a modified control valve shown in the general direction of arrow 10, and the other of collar 9 to a conventional fuel supply outlet (only the uppermost lip of which is visible at 8), such outlet fixture being supplied by a fuel storage container 11. This novel mechanical coupling apparatus comprises the present invention to be described herein.

Figure 2:
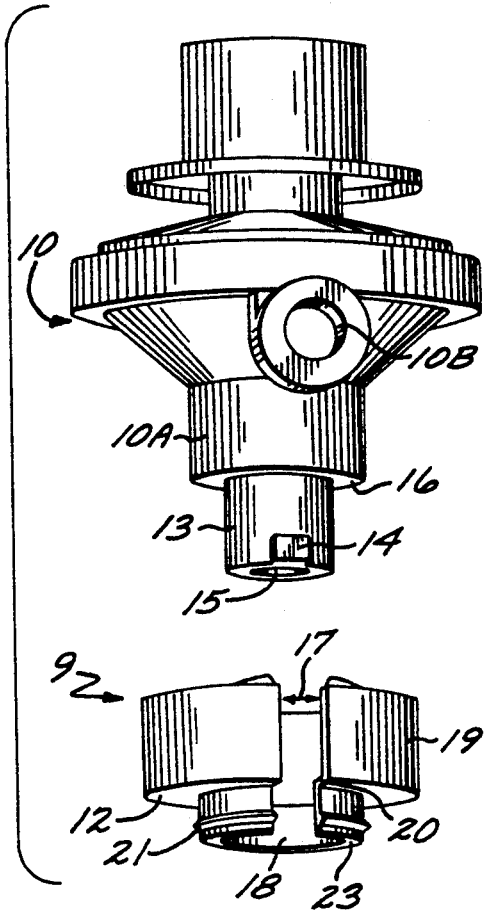
FIG. 2 is a pictorial view looking upwardly from the side of a control valve above the disengaged plastic collar.

Referring now to FIG. 2, a conventional screw thread type control valve is shown at arrow 10, with an integral valve inlet casing 10A. Casing 10A is modified with an integral valve inlet shaft 13. Shaft 13 can be manufactured as part of control valve 10, or included as a permanent modification to a conventional screw thread type control valve as illustrated in the preferred embodiment herein. A protruding pin is formed on the outside lower rim of shaft 13. To be noticed further is the opening of a lumen 15 at the bottom of shaft 13 which provides a open port to an inlet valve orifice housed therein (not shown in FIG. 2).

Illustrated beneath the control valve is a plastic collar shown in the general direction of arrow 9. Collar 9 is clearly characterized by concentric cylindrical upper and lower contiguous portions. The lower portion forms a socket 18, into which shaft 13 fully articulates. Formed on the lower margin of the exterior perimeter of socket 18 is an annular rib 21. A broad underside 12 of the upper portion of collar 9 and rib 21 form a channel around lip 8 (not shown in FIG. 2) that centrically stations collar 9 on a supply outlet (not shown in FIG. 2). The upper portion of collar 9 forms a cup 19 into which inlet casing 10A of control valve 10 nests when shaft 13 is fully articulated into socket 18.

Collar 9 has a substantially vertical cut out section forming an open slot or aperture 17 through cup 19 and socket 18. Notwithstanding of this discontinuity breaking the perimeter of collar 9, a substantially cylindrical shape is always statically retained due to elastic resistance to transverse deformation from the normal static mold as shown in all Figures. However, adequate manual pressure applied on both sides of aperture 17 will temporarily overcome this static resistance so that collar 9 is transversely compressed and aperture 17 substantially closes. Thusly temporary manual deformation of rib 21 makes the diametric shape of socket 18 eccentric. This allows insertion or retraction of collar 9 onto or off of lip 8 (not shown in FIG. 2), for engagement to or from the supply outlet (not shown in FIG. 2).

Aperture 17 also has a critical role in a bayonet type engagement of collar 9 to shaft 13. As evident in FIG. 2, when control valve 10 is inserted into the lumen of collar 9, pin 14 plays into aperture 17 much like a keyway. Engagement of control valve 10 to collar 9 is normally actuated by manually holding collar 9 still, while manually articulating shaft 13 into collar 9 so that pin 14 slides through aperture 17 until the bottom rim 16 of inlet casing 10A seats on the bottom of cup 19. At this point pin 14 exits just beyond the mouth of aperture 17, and subsequent rotation of control valve 10 will bind pin 14 beneath the lowermost rim 23 of collar 9.

Figure 3:
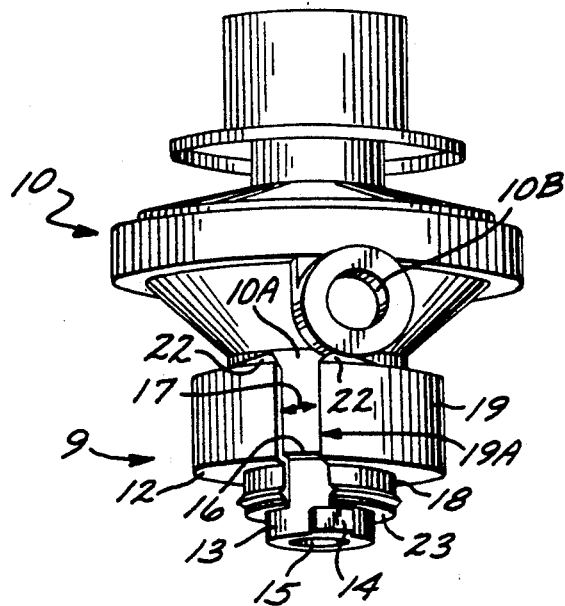
FIG. 3 is a pictorial view of the control valve engaged with the collar.

Referring now to FIG. 3, control valve 10 has been rotated slightly to the right in collar 9, initiating engagement. Shaft 13 is shown fully inserted into socket 18, and pin 14 is binding beneath lowermost rim 23 of collar 9. Bottom rim 16 of inlet casing 10A is visible through aperture 17 seated into the bottom of cup 19. Two small ramps 22, one on each side of aperture 17 formed rising from the uppermost rim of collar 9 provide positive means for locking engagement or disengagement. These ramps could be placed on the lowermost rim 23 of collar 9, but the preferred embodiment makes use of a projecting outlet port 10B found on most conventional control valves.

It is to be noticed that outlet port 10B and pin 14 are aligned, and the height of cup 19 is made such that for pin 14 to enter or leave the mouth of aperture 17 one of ramps 22 must be overridden by outlet port 10B. Substantial manual rotational force is necessary to override ramps 22. The plasticity of collar 9 permits (specifically referring to FIG. 3) wall 19A of cup 19 to bow outwardly, and then elastically snap back into form if adequate force rotates port 10B onto ramps 22. FIG. 3 shows a position where port 10B has just surmounted the apex of the right ramp 22, and the apex is skewed towards the aperture, so that now control valve 10, shaft 13, and pin 14 will slide to the right for complete engagement. It should be noted however, that as shown in FIG. 3, collar 9 and control valve 10 are engaged; only when pin 14 is entirely into the mouth of aperture 17 will shaft 13 pop off and the coupling instantaneously disengage.

When collar 9 is stationed in the supply outlet (not shown in FIG. 3), the above described engagement forces the connection of an inlet orifice in inlet casing 10A and an outlet orifice in the supply outlet. This connection is also forceably sealed by the above described engagement and occurs in the lumen 15 of shaft 13. Therefore since the above described engagement is either on or off, no in between stage of connection allowing leakage between partially connected supply and inlet orifices (not shown in FIG. 3) can occur.

Figure 4:
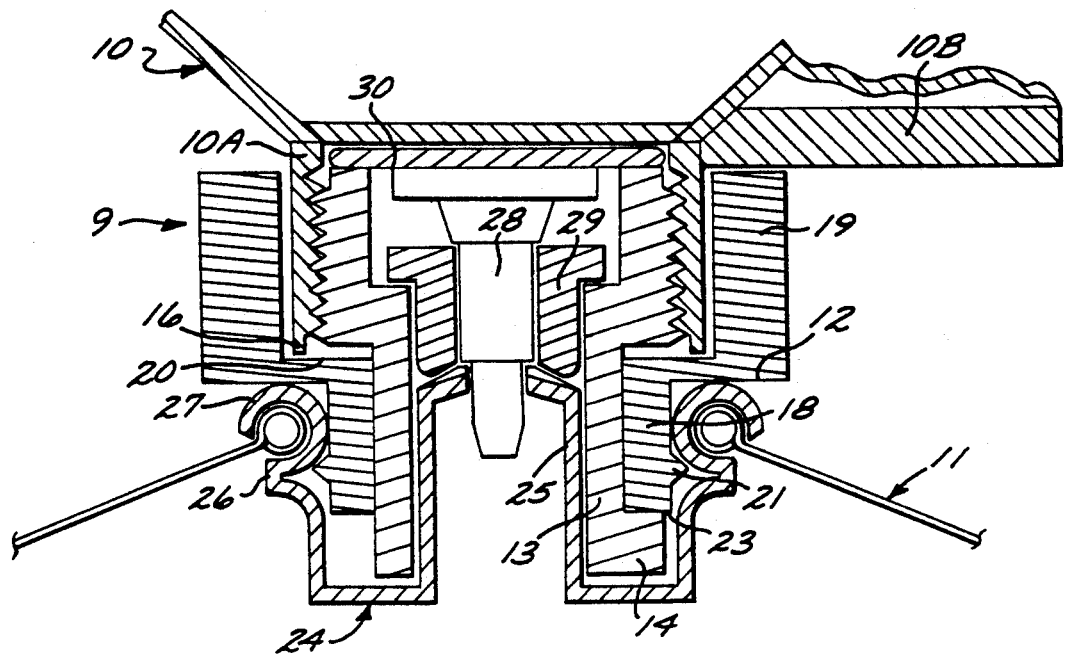
FIG. 4 is a cross section of the inlet casing of the control valve engaged with the collar, which is in turn engaged with a fuel cannister outlet.

Referring now to FIG. 4, while tolerances between parts has been exaggerated for clarity, the relationship between coupling, cannister outlet, control valve inlet, and the orifice connection is best shown in cross section. A lower portion of Control valve 10 is shown including inlet casing 10A, and a lower section of outlet port 10B setting just above an upper rim 32 of cup 19 of collar 9. The upper portion of shaft 13 is visible threadedly connected to inlet casing 10A. The preferred embodiment makes use of a conventional screw thread control valve, by screw threading and fastening shaft 13 with an epoxy (not shown) where a screw thread type cannister would have been conventionally. Shaft 13 is permanently set for the proper distance between the contact of the bottom rim 16 of inlet casing 10A on cup 19 at surface 20, and the top of pin 14, so that the height of socket 18 is closely held in between for a snug coupling. Pin 14 is also set in alignment with outlet port 10B, for reasons previously described.

Collar 9 is shown engaged with a conventional (European type) supply outlet fixture indicated at 24, connected to the storage cannister body 11 (rim partially shown). A lip 27 on outlet fixture 24 is caught between rib 21 and cup 19 at undersurface 12. Rib 21 further locates in an annular depression or groove 26 formed just under lip 27. It should be noted that although the preferred material for shaft 13 is a polymer, shaft 13 is rigid. Therefore whenever shaft 13 is engaged into socket 18, plastic collar 9 cannot be deformed and is locked into rigid engagement with supply outlet 24. It is to be noticed further, that the entire coupling thus engaged, including shaft 13 of the control valve, collar 9, and the connected orifices and seals can freely rotate within outlet fixture 24. Therefore the integrity of the coupling and accordingly the integrity of the orifice connections are not potentially affected by movement of any of the parts during normal use of the coupled apparatus and associated appliances.

The orifice connection between inlet orifice 28 and outlet orifice nipple 25 occurs in the lumen of shaft 13. Inlet orifice 28 being the lower portion of a needle valve (not shown above inlet casing 10A). A cylindrical seal 29 is formed to permanently occlude the upper portion of the lumen of shaft 13 about inlet orifice 28. Seal 29 is also pressed into full contact about outlet orifice nipple 25, surrounding the orifice connection interface. A conventional washer seal 30 contacts the upper rim of shaft 13 to seal the top of lumen 15 (not indicated by number). These seals are secondary to a conventional primary sealing means made at the orifice contact interface (not shown). Full insertion of inlet orifice 28 as well as compression of sealing means 29 occurs when control valve 10 is pressed into collar 9 with enough pressure to rotate pin 14 underneath collar 9.

Figure 5:
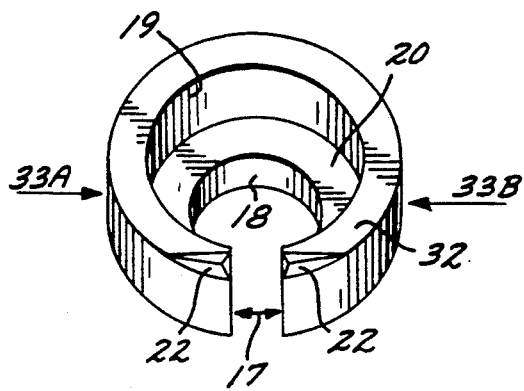
FIG. 5 is a pictorial view looking downwardly and directly through the aperture of the collar.

Referring now to FIG. 5, the inside of collar 9 is illustrated so that the lumen structure is more clearly shown. Ramps 22 on the uppermost rim 32 of cup 19 lie to either side of the top of aperture 17. The inside of Socket 18 is visible below the bottom surface 20 of cup 19. It is to be noticed that the walls of cup 19 are substantially thickened for elastic resistance to transverse deformation. This elastic resistance must be overcome by manual squeezing forces normally in the directions of arrows 33A and 33B, to begin closing aperture 17 and subsequently change the diametric shape of collar 9 so that socket 18 can be inserted into a supply outlet fixture (not shown in FIG. 5).

Figure 6:
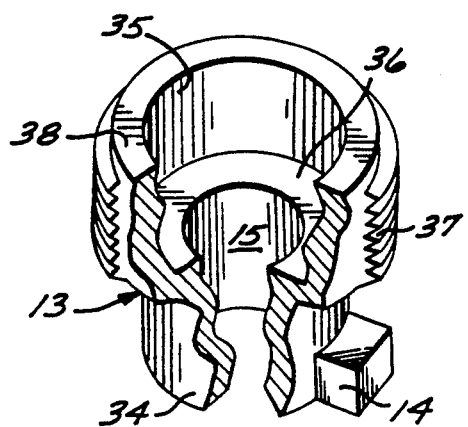
FIG. 6 is a pictorial view looking downwardly at the shaft part, with a frontal portion broken away.

Referring now to FIG. 6, shaft 13 is illustrated with a frontal portion broken away for better understanding of inside and outside surfaces. A lower cylindrical portion 34 comprising the part of the shaft which articulates into collar socket 18 (not shown in FIG. 6) is illustrated with pin 14 projecting from its lower margin. The lumen 15 has an upper flared edge 36 for seating sealing means 29 (not shown in FIG. 6). An upper cylindrical portion 35 of shaft 13 has a plurality of screw threads 37 on its exterior perimeter for permanent installation into corresponding screw threads in the control valve inlet casing 10A (not shown in FIG. 6). A substantially flat upper rim 38 is shown which will contact the conventional washer seal 30 in the conventional control valve inlet casing 10A.

It may be thus seen that the objects of the present invention set forth herein, as well as those made apparent from the foregoing description are efficiently attained. While preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

We claim:

1. A coupling apparatus for interconnecting a fluid supply control valve having an inlet orifice to a fluid supply outlet fixture having an outlet orifice centrally located in a cylindrical recess formed therein, said recess having an inwardly protruding lip formed about its circumference, wherein the coupling apparatus comprises:

a collapsible annular collar, having an outwardly protruding rib extending about its circumference, configured and dimensioned for insertion into said fixture's cylindrical recess upon collapse and wherein said rib engages the lip of said outlet fixture so as to prevent the collar's extraction from said recess upon expansion of said collar; and a hollow shaft extending from said control valve and centered about said inlet orifice, configured and dimensioned so as to be slidably insertable into said collar while said collar is in its expanded state so as to bring the inlet orifice into fluid communication with the outlet orifice, said hollow shaft including means to hook under said collar upon full insertion and relative rotation thereto whereby the presence of the shaft within the collar prevents the collar's collapse and whereby the inlet and outlet orifices are firmly held in fluid communication with one another.

2. The coupling apparatus of claim 1 wherein said hollow shaft has a pin protruding radially outward from near its distal end which is dimensioned and configured to hook under the distal edge of said collar.

3. The coupling apparatus of claim 2 wherein said shaft is threadedly received within said control valve.

4. The coupling apparatus of claim 1 wherein said collar is constructed of elastic material, has a longitudinally oriented gap formed therein and wherein the outside diameter of said collar in its expanded state substantially conforms to the inside diameter of the recess in said outlet fixture, while the gap is dimensioned such that upon collapse, the overall diameter of the collar is reduced sufficiently to allow the outwardly protruding rib to be passed by the outlet fixture's inwardly protruding lip.

5. The coupling apparatus of claim 4 wherein said hollow shaft has a pin protruding radially outwardly from near its distal end, dimensioned and configured so as to pass completely through the gap in said collar upon insertion of the shaft into said collar and to hook under the distal edge of said collar upon rotation of the shaft relative the collar.

6. The coupling apparatus of claim 5 wherein said control valve includes a radially outward protruding member that engages the proximal edge of the collar upon full insertion of the shaft thereinto wherein the collar further comprises a pair of ramps formed in the proximal edge of said collar whereby interaction between said radially outward protruding member and said ramps requires a preselected amount of force to be applied when rotating the control valve relative said collar to a position wherein said protruding member is centered between said ramps.

7. The coupling apparatus of claim 6 wherein said ramps are disposed on either side of said gap and wherein said radially outward protruding member is angularly aligned with said pin protruding radially outward from said shaft.

8. The coupling apparatus of claims 7 wherein said radially outward protruding member comprises an outlet port.

9. The coupling apparatus of claim 8 wherein said shaft is threadedly received within said control valve.

* * * * *